US012698777B2

(12) United States Patent
Rathke et al.

(10) Patent No.: US 12,698,777 B2
(45) Date of Patent: Aug. 4, 2026

(54) AUTOMOTIVE ELECTRONIC FLOW PUMP

(71) Applicant: PIERBURG PUMP TECHNOLOGY GMBH, Neuss (DE)

(72) Inventors: Ronald Rathke, Neuss (DE); Toni Henke, Neuss (DE); Markus Riedel, Neuss (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 18/832,930

(22) PCT Filed: Jan. 28, 2022

(86) PCT No.: PCT/EP2022/052086

§ 371 (c)(1),
(2) Date: Jul. 25, 2024

(87) PCT Pub. No.: WO2023/143736

PCT Pub. Date: Aug. 3, 2023

(65) Prior Publication Data

US 2025/0109749 A1      Apr. 3, 2025

(51) Int. Cl.
*F04D 13/06*        (2006.01)
*F01P 5/12*         (2006.01)
(Continued)

(52) U.S. Cl.
CPC ............ *F04D 13/0666* (2013.01); *F01P 5/12* (2013.01); *F04D 13/0693* (2013.01);
(Continued)

(58) Field of Classification Search
CPC .... F01P 5/12; F04D 13/0606; F04D 13/0666; F04D 13/0693; F04D 29/186;
(Continued)

(56) References Cited

U.S. PATENT DOCUMENTS

| | | | |
|---|---|---|---|
| 9,360,015 B2 * | 6/2016 | Muizelaar | F04D 29/026 |
| 2012/0007531 A1 * | 1/2012 | Krishnamoorthy | F04D 27/001 |
| | | | 318/472 |

(Continued)

FOREIGN PATENT DOCUMENTS

| | | | | |
|---|---|---|---|---|
| CN | 111425408 A | * | 7/2020 | F04D 29/5813 |
| DE | 3822897 A1 | * | 1/1990 | F04D 29/5813 |

(Continued)

*Primary Examiner* — Essama Omgba
*Assistant Examiner* — Joseph S. Herrmann
(74) *Attorney, Agent, or Firm* — Norman B. Thot

(57) ABSTRACT

An automotive electronic flow pump includes a rotating pump wheel, a pump housing, an axial-flux motor, a static separation wall, and a motor electronics. The pump wheel has an axial fluid inlet at a wheel upstream front side and a radial fluid outlet. The pump housing defines a pumping chamber and an electronics chamber. The axial-flux motor directly drives the pump wheel and is arranged within the pumping chamber. The axial-flux motor includes a motor stator having at least one stator coil, and a motor rotor arranged at a front side of the pump wheel which co-rotates with the pump wheel. The static separation wall is arranged at a backside of the pump wheel. The static separation wall fluidically separates the pumping chamber from the electronics chamber. The motor electronics is arranged in the electronics chamber and is directly electrically connected to the at least one stator coil.

14 Claims, 4 Drawing Sheets

(51) Int. Cl.

| | | |
|---|---|---|
| *F04D 29/18* | (2006.01) | |
| *F04D 29/58* | (2006.01) | |
| *H02K 7/14* | (2006.01) | |
| *H02K 1/18* | (2006.01) | |
| *H02K 7/08* | (2006.01) | |

(52) U.S. Cl.
CPC ....... *F04D 29/186* (2013.01); *F04D 29/5813* (2013.01); *H02K 7/14* (2013.01); *H02K 1/182* (2013.01); *H02K 7/086* (2013.01); *H02K 2211/03* (2013.01)

(58) Field of Classification Search
CPC . F04D 29/4293; F04D 29/5813; H02K 7/086; H02K 7/088; H02K 7/14; H02K 11/33; H02K 21/24; H02K 2211/03; H02K 1/182; H02K 1/2793–2798
USPC ...................................................... 310/268, 71
See application file for complete search history.

(56) References Cited

U.S. PATENT DOCUMENTS

| | | | |
|---|---|---|---|
| 2014/0377101 A1 | 12/2014 | Mueller | |
| 2016/0365768 A1* | 12/2016 | Popov ................. | F04D 13/0633 |
| 2018/0238348 A1* | 8/2018 | Pawellek ............ | F04D 13/0693 |
| 2018/0245596 A1 | 8/2018 | Van Steenburg et al. | |
| 2019/0203724 A1* | 7/2019 | Kuronuma .......... | F04D 13/0666 |
| 2019/0257319 A1 | 8/2019 | Kuronuma et al. | |

FOREIGN PATENT DOCUMENTS

| | | |
|---|---|---|
| DE | 10 2012 200 807 B4 | 9/2014 |
| JP | 2011-106323 A | 6/2011 |
| WO | WO 2018/140731 A1 | 8/2018 |

* cited by examiner

AUTOMOTIVE ELECTRONIC FLOW PUMP

CROSS REFERENCE TO PRIOR APPLICATIONS

This application is a U.S. National Phase application under 35 U.S.C. § 371 of International Application No. PCT/EP2022/052086, filed on Jan. 28, 2022. The International Application was published in English on Aug. 3, 2023 as WO 2023/143736 A1 under PCT Article 21(2).

FIELD

The present invention relates to an automotive electronic flow pump, for example, to an automotive coolant liquid pump for generating a coolant flow in a coolant circuit, for example, in a traction engine coolant circuit.

BACKGROUND

An electronic flow pump comprises a motor electronics which is energized by the automotive DC power supply network and which generates a rotating electromagnetic field via a motor stator with at least one stator coil. The electromagnetic part of an electronic flow pump can be realized as a radial-flux motor or as an axial-flux motor, whereas an axial-flux motor generally is more compact compared to a radial-flux motor of the same electric performance. DE 10 2012 200 807 B4, WO 2018 140 731 A1 and JP 2011-106 323 A each respectively describe a stationary AC flow pump provided with an axial-flux motor.

SUMMARY

An aspect of the present invention is to provide a compact automotive electronic flow pump.

In an embodiment, the present invention provides an automotive electronic flow pump which includes a pump wheel which is configured to rotate, a pump housing, an axial-flux motor, a static separation wall, and a motor electronics. The pump wheel comprises an axial fluid inlet at a wheel upstream front side and a radial fluid outlet. The pump housing defines a pumping chamber and an electronics chamber. The axial-flux motor is configured to directly drive the pump wheel and is arranged within the pumping chamber. The axial-flux motor comprises a motor stator which comprises at least one stator coil, and a motor rotor which is arranged at a front side of the pump wheel and which is configured to co-rotate with the pump wheel. The static separation wall is arranged at a backside of the pump wheel. The static separation wall is configured to fluidically separate the pumping chamber from the electronics chamber. The motor electronics is arranged in the electronics chamber. The motor electronics is directly electrically connected to the at least one stator coil.

BRIEF DESCRIPTION OF THE DRAWINGS

The present invention is described in greater detail below on the basis of embodiments and of the drawings in which.

DETAILED DESCRIPTION

Figure 1:
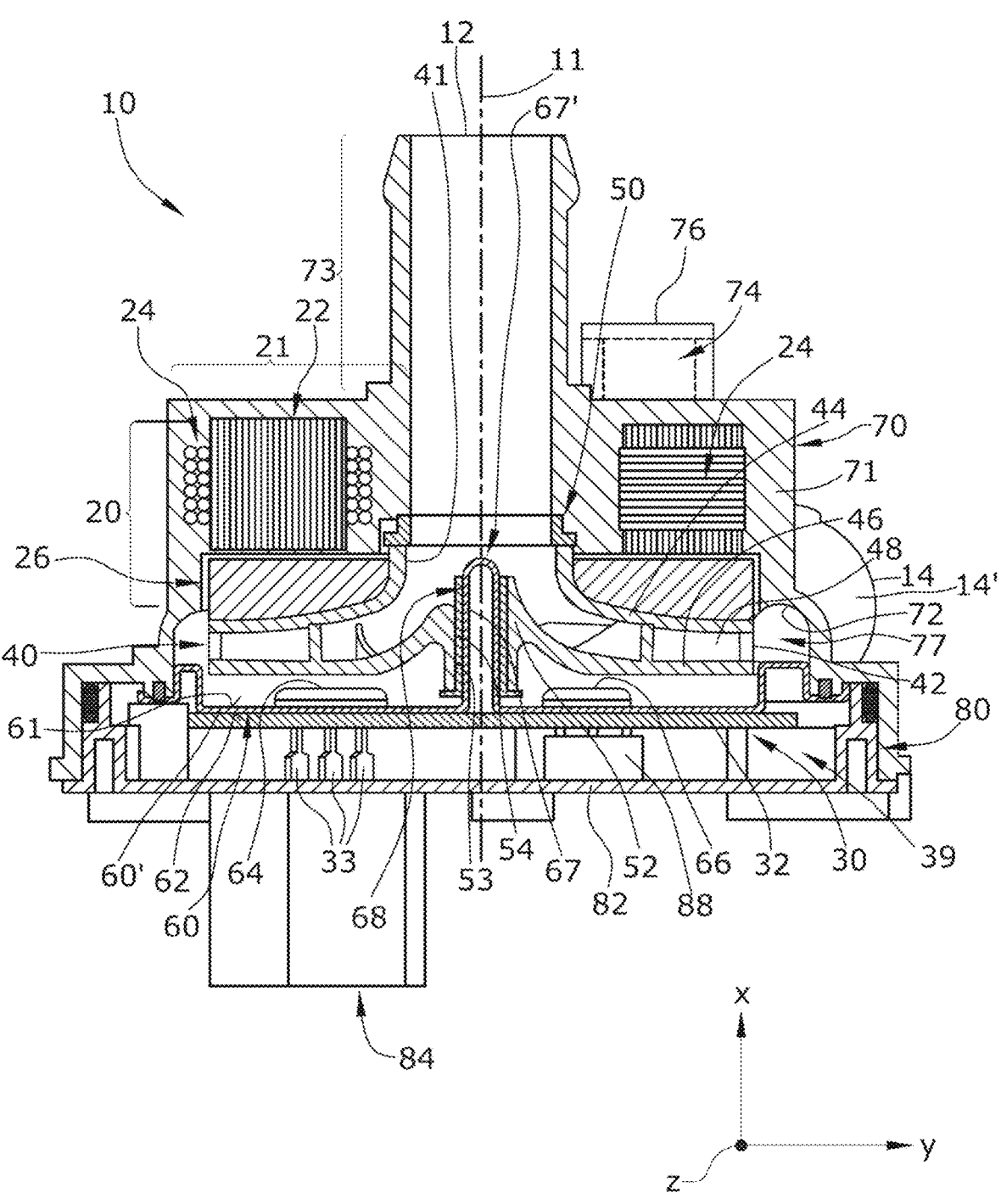
FIG. 1 shows a longitudinal cross section of an automotive electric flow pump according to the present invention, the pump housing being substantially defined by a pump housing main body and an electronics lid body.

The automotive electronic flow pump according to the present invention is provided with an axial-flux motor for driving the fluidic part of the pump. The automotive electronic flow pump is provided with a rotatable pump wheel with an axial fluid inlet at the wheel-upstream front side of the pump wheel and with a radial ring-like fluid outlet at the outer circumference of the pump wheel. The pump wheel is a so-called impeller. The pump wheel is arranged within a pumping chamber which is defined by a pump housing. The axial-flux motor directly drives the pump wheel and comprises at least one motor stator coil and, for example, a permanently magnetized motor rotor which is co-rotatably provided at the upstream front side of the pump wheel. The pump wheel including the motor rotor is arranged in a wet section of the flow pump which is filled with the pumping fluid.

A static separation wall is provided at the backside of the pump wheel and fluidically separates the wet pumping chamber from an adjacent dry electronics chamber. A motor electronics is provided in the electronics chamber and is electrically connected to the stator coil(s) to drive the stator coil(s). The motor electronics is energized by the automotive direct current network and electronically generates a rotating magnetic field which is followed by the permanently magnetized motor rotor. The motor is a so-called brushless synchronous DC motor.

As viewed form an axial direction, the pump wheel and the motor rotor are arranged axially between the motor stator and the motor electronics. The static separation wall is therefore a part of the pumping chamber wall arrangement and is therefore perfectly cooled by the pump fluid which can, for example, be a coolant liquid. The motor electronics including the power semiconductors of the motor electronics at the distal side of the static separation wall is therefore effectively cooled by the pump fluid. Since the motor is designed as an axial-flux motor, the electronic flow pump can be provided to be very compact. The total wet surface of the rotor including the pump wheel and the motor rotor, and the resulting total moment of fluid friction is relatively small compared to a flow pump with a radial-flux motor so that the hydraulic friction losses caused by the wet motor rotor are relatively small.

The motor electronics can, for example, be electrically connected to the at least one stator coil by at least two coil-connecting wires axially passing the pumping chamber radially outside of the pumping chamber. All coil-connecting wires, for example, three coil-connecting wires, can, for example, be combined and concentrated in one single coil-connecting wires path and are not distributed over the complete circumference of the pump. All coil-connecting wires are provided within a single circumferential sector of less than 60°. The coil-connecting wires path is provided with a substantially axial orientation which does not necessarily mean that the coil connecting wires are orientated exactly axially.

The coil-connecting wires path can, for example, be provided circumferentially in an upstream volute-half-sector, not in the downstream volute-half-sector. The upstream volute half-sector is the sector of about 170-180° fluidically starting from where the volute has the smallest total fluidic cross section and ending in the middle of the volute path.

Since the volute cross-section is relatively small in the first upstream volute-sector-half, the total flow pump diameter is not substantially affected by the coil-connecting wires path arranged in the sector with a relatively small volute cross section. The coil-connecting wires path can, for example, be provided close to or adjacent to a tangential pump outlet duct.

Another aspect of the present invention provides that the separation wall is a metal sheet body and the motor electronics is, at least in part, in direct thermal contact with the separation wall. The power semiconductors of the motor electronics are in particular in direct thermal contact with the distal surface of the separation wall so that the power semiconductors are reliably cooled by the pump fluid continuously flowing over the proximal surface of the metal separation wall.

The separation wall body can, for example, define an axially protruding friction bearing support element, and can thereby define the inner bearing ring of a radial friction bearing.

The separation wall can, for example, substantially lie in a transversal plane and be provided with at least one proximal protuberance projecting into the wet pumping chamber. An axial contact pin end protrudes from a printed circuit board of the motor electronics into the protuberance cavity defined by the proximal protuberance.

For providing a simple and high-power transferring welding connection, it is difficult to avoid an axial proximal projection of a contact pin being welded or soldered to the printed circuit board. Since the axial proximal contact pin projection can protrude into the protuberance cavity, the motor electronics printed circuit board can be arranged very close or in direct contact to the separation wall sheet body so that a large area of the printed circuit board is effectively cooled by the pump fluid via the separation wall sheet body.

A plastic electronics chamber lid body can, for example, distally enclose the electronics chamber, whereas at least a cast-in section of a stiff U-shaped coil connecting wire is cast-in the plastic lid body. The plastic lid body has a lid function and additionally has a connecting wire holding function, and mechanically supports an axial part or a section of the coil connecting wire to electrically isolate the coil connecting wire and to facilitate the assembly of the flow pump.

The U-shaped coil-connecting wire has two wire legs which are orientated substantially axially and in parallel to each other. The legs are connected to each other by a legs-connecting wire bridge of the U-shaped coil-connecting wire. The legs-connecting wire bridge can, for example, lie substantially in a transversal plane.

A pin end of an axial electronics connector leg of the coil connecting wire can, for example, be electrically directly connected, for example, welded or soldered, to a printed circuit board of the motor electronics. The other leg which is the axial coil-connector leg of the U-shaped coil-connecting wire can, for example, laterally pass the fluid chamber including the rotatable pump wheel to define a part of the axial electric connection between the motor electronics and the at least one stator coil.

The legs-connecting wire bridge of the connector wire can, for example, define the cast-in section of the coil-connecting wire, which section is cast-in the plastic electronics chamber lid body.

The automotive electronic flow pump is provided with an electrical connector plug which is provided with several electric pump connector pins. At least two pump connector pins of the connector plug are cast-in the plastic electronics chamber lid body. The proximal pin ends of the connector pins are directly electrically connected to a printed circuit board of the motor electronics. The proximal pin ends can, for example, project into a protuberance cavity of a separation wall protuberance.

The proximal pin end of the coil-connecting wire end of the pump connector pins are all parallel to each other and are axially orientated.

A pump housing main body can, for example, define an axial pump inlet opening and a tangential pump outlet opening, and also defines an assembly chamber where a coil-connecting wire end and a wire end of a separate coil wire of the stator coil are electrically connected to each other by welding or soldering. The coil wire provides a substantially radial electric connection between the motor electronics connector wire end and the corresponding stator coil. The assembly chamber allows for the electrical connection of the motor electronics connector wire end and the stator coil connector wire end with each other. The electrical and mechanical connection of the wire ends can be of any suitable technique, for example, a welding or soldering connection.

The pump housing main body can, for example, define an assembly chamber access opening which is closed by a separate access chamber opening lid. During the pump assembling process, the assembly chamber is accessible through the assembly chamber access opening so that the corresponding wire ends can be electrically and mechanically connected to each other, for example, by a welding process. After all wire end connections have been made, the assembly chamber access opening is closed by applying and fixing the access chamber opening lid to the access opening. The access chamber opening lid can, for example, be made of plastic.

An embodiment of the present invention is described below with reference to the enclosed drawings.

The drawings show an automotive electronic flow pump 10 which, in the present embodiment, is a liquid pump for a primary or a secondary cooling circuit of the automotive unit. The electronic flow pump 10 comprises an electronic axial-flux motor 20 which directly drives a rotatable pump wheel 40.

The plastic pump wheel 40 is a so-called impeller and is provided with a ring-like pump wheel front wall 44 which defines an axial circular fluid inlet 41 at the upstream front side, a disc-like pump wheel back wall 46, and several pump wheel blades 48 which are arranged between the pump wheel front wall 44 and the pump wheel back wall 46. The rotatable pump wheel 40 defines a circumferential radial fluid outlet 42 with a substantially cylindrical outlet opening. The pump wheel 40 rotates around a rotational axis 11 defining the axial direction x.

The electromagnetic part of the electronic axial-flux motor 20 is substantially defined by a static motor stator 21 and a permanently magnetized and ring-like motor rotor 26 which is co-rotatably fixed to the front side surface of the pump wheel front wall 44. The motor stator 21 is defined by a ring-like stacked stator body 22 and several stator coils 24 which are electrically arranged in three phases in a triangle or a star arrangement.

The electronic axial-flux motor 20 is a brushless synchronous DC motor and is provided with a motor electronics 30 comprising a printed circuit board 32, several power semiconductors assembled to the printed circuit board 32, and a commutation unit at the printed circuit board 32. The motor electronics 30 energizes the stator coils 24 to thereby generate a rotating electromagnetic field to which the motor rotor 26 follows.

The pump housing is defined by a plastic main housing part 70 and a separate plastic electronics chamber lid body 80. The main housing part 70 defined by the plastic main housing part body 71 substantially surrounds a wet pumping chamber 77 with a cavity for housing the pump wheel 40 and with a circumferential pumping volute channel 72 with a continuously increasing cross-sectional area from the volute start to the volute end. The volute end leads into a tangential pump outlet duct 14' which defines a tangential pump outlet 14. The main housing part 70 also defines an axial pump inlet duct 73 which defines an axial pump inlet 12.

The wet pumping chamber 77 is separated from the dry electronics chamber 39 which houses the motor electronics 30 by a static separation wall 60 which is defined by a disc-like metal sheet separation wall body 60' substantially lying in a transversal plane yz and having a distal dry surface 62 and a proximal wet surface 61. The separation wall body 60' also integrally defines an axial, hollow and sleeve-like bearing shaft body 67 which provides a static friction bearing support element 67' of a radial friction bearing for the rotor comprising of the pump wheel 40 and the motor rotor 26. The radial rotor bearing arrangement is also provided with a separate cylindrical low-friction bearing sleeve 54 between the cylindrical outside surface 68 of the bearing shaft body 67 and the cylindrical inside surface 53 of a cylindrical integral bearing part 52 of the pump wheel 40.

The pump wheel 40 is axially supported by an axial bearing ring 50 between the inlet opening ring surface around the pump wheel fluid inlet 41 and the corresponding static ring surface of the main housing part body 71.

Figure 2:
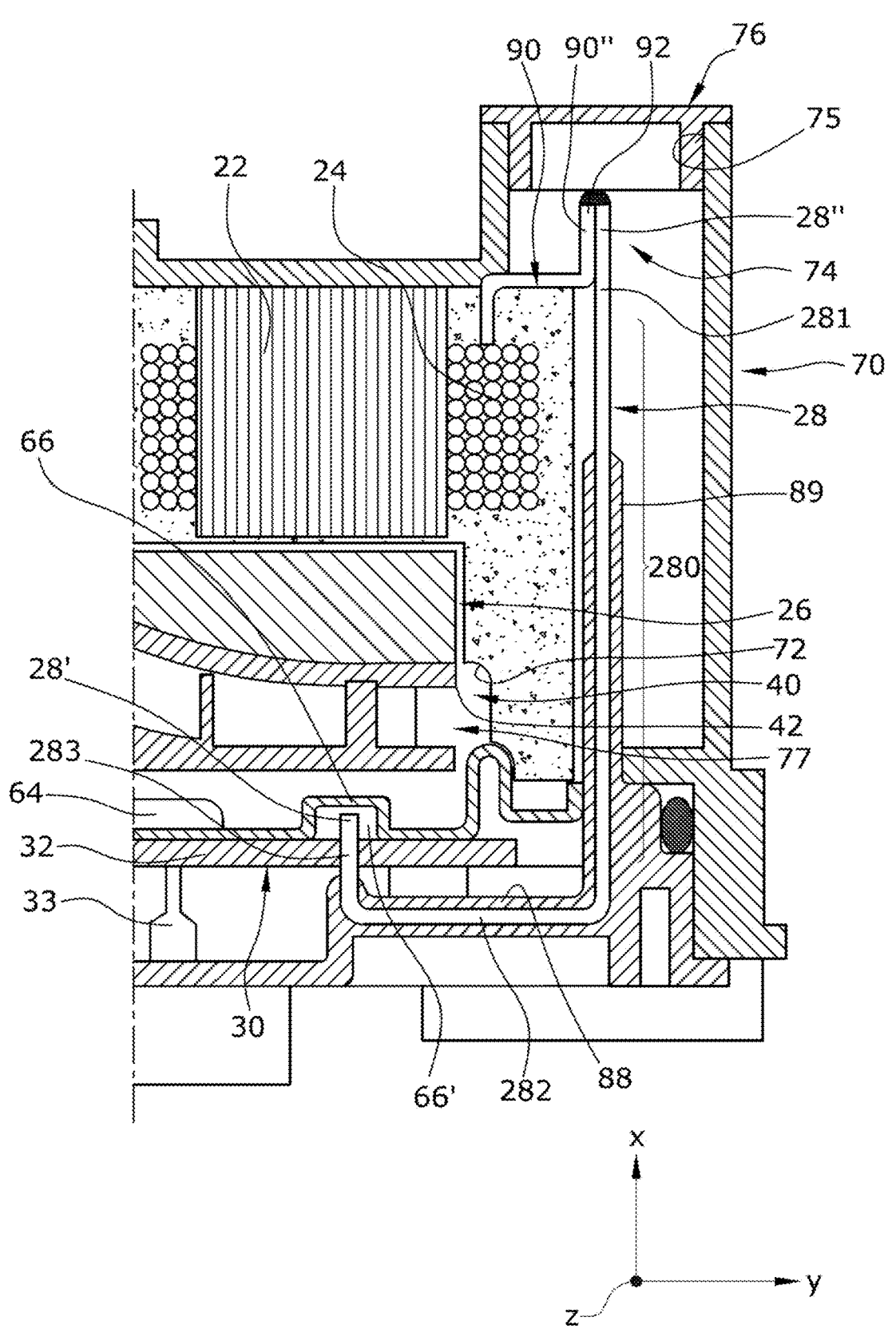
FIG. 2 shows a longitudinal cross-section in another circumferential angle of a detail of the flow pump of FIG. 1.
Figure 3:
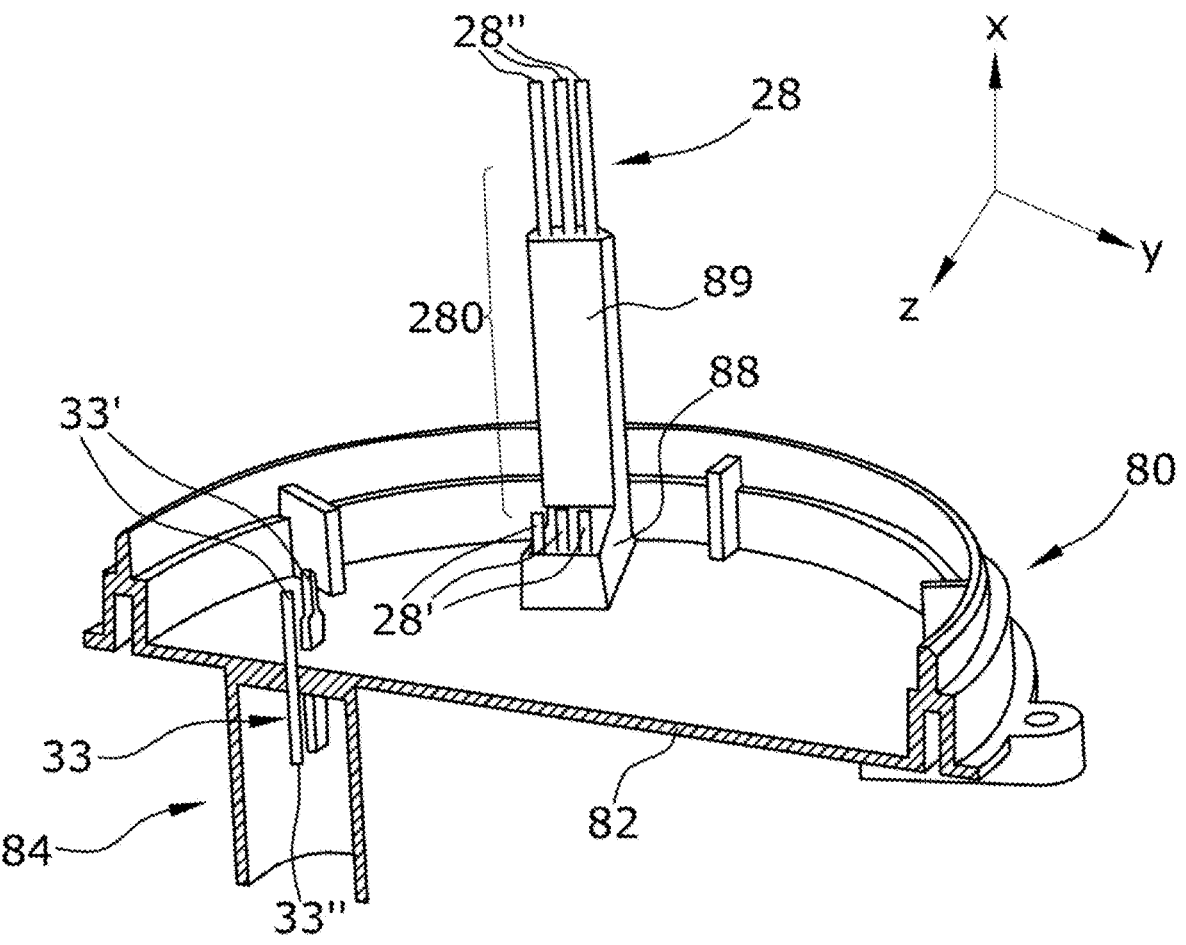
FIG. 3 shows a perspective view of a section of the electronics lid body of FIG. 1.

The printed circuit board 32 of the motor electronics 30 is electrically connected to the stator coils 24 by three coil-connecting wires 28 axially passing the pumping chamber 77 radially outside of the wet pumping chamber 77. The coil-connecting wires 28 are combined in one single and substantially axial connecting wires path 280 as shown in FIGS. 2 and 3. The coil-connecting wires 28 each have a U-shaped form as shown in FIG. 2. Every coil-connecting wire 28 has a short axial electronics connector leg 283, a long axial coil connector leg 281, and a legs-connecting bridge 282 which substantially lie in the transversal plane yz. As shown in FIGS. 2 and 3, the legs-connecting bridge 282 and a substantial part of the axial coil connector leg 281 are integrally cast-in into the plastic electronics chamber lid body 80. The electronics chamber lid body 80 is provided with an integral massive bridge portion 88 and an integral massive axial leg portion 89, both of which axially-proximally protrude from the transversal end wall 82 of the electronics chamber lid body 80. The two lid body portions 88, 89 together have the form of the block letter L and thereby electrically isolate and mechanically support a substantial length of every coil-connecting wire 28.

An axial pin end 28' of the axial electronics connector leg 283 of every coil-connecting wire 28 is electrically directly connected by soldering to the printed circuit board 32 of the motor electronics 30. The axial pin ends 28' proximally project from the proximal surface of the printed circuit board 32, and thereby project into a protuberance cavity 66' which is defined by a proximal protuberance 66 of the separation wall 60. Most of the proximal surface of the printed circuit board body 32 is in a direct thermal contact with the separation wall 60. The thermal contact can be improved by a thin layer of a suitable material having high thermal conductivity.

The non-isolated end section of every coil connector leg 281 of the three coil-connecting wires 28 projects into an assembly chamber 74 defined by the main housing part 70. The coil-connecting wire ends 28" of the coil connector legs 281 are respectively welded together and thereby electrically connected with corresponding wire ends 90" of three coil wires 90 via a suitable welding seam 92. The three coil wires 90 electrically connect the three phases of the stator coils 24 with the three corresponding coil-connecting wires 28.

The assembly chamber 74 is axially accessible via an assembly chamber access opening 75 for providing the welding action for electrically and mechanically connecting the wire ends 28", 90" after the mechanical assembly of all pump components. The assembly chamber access opening 75 is finally closed by a separate access opening lid 76 to thereby provide a fluid-tight isolation of the assembly chamber 74.

Figure 4:
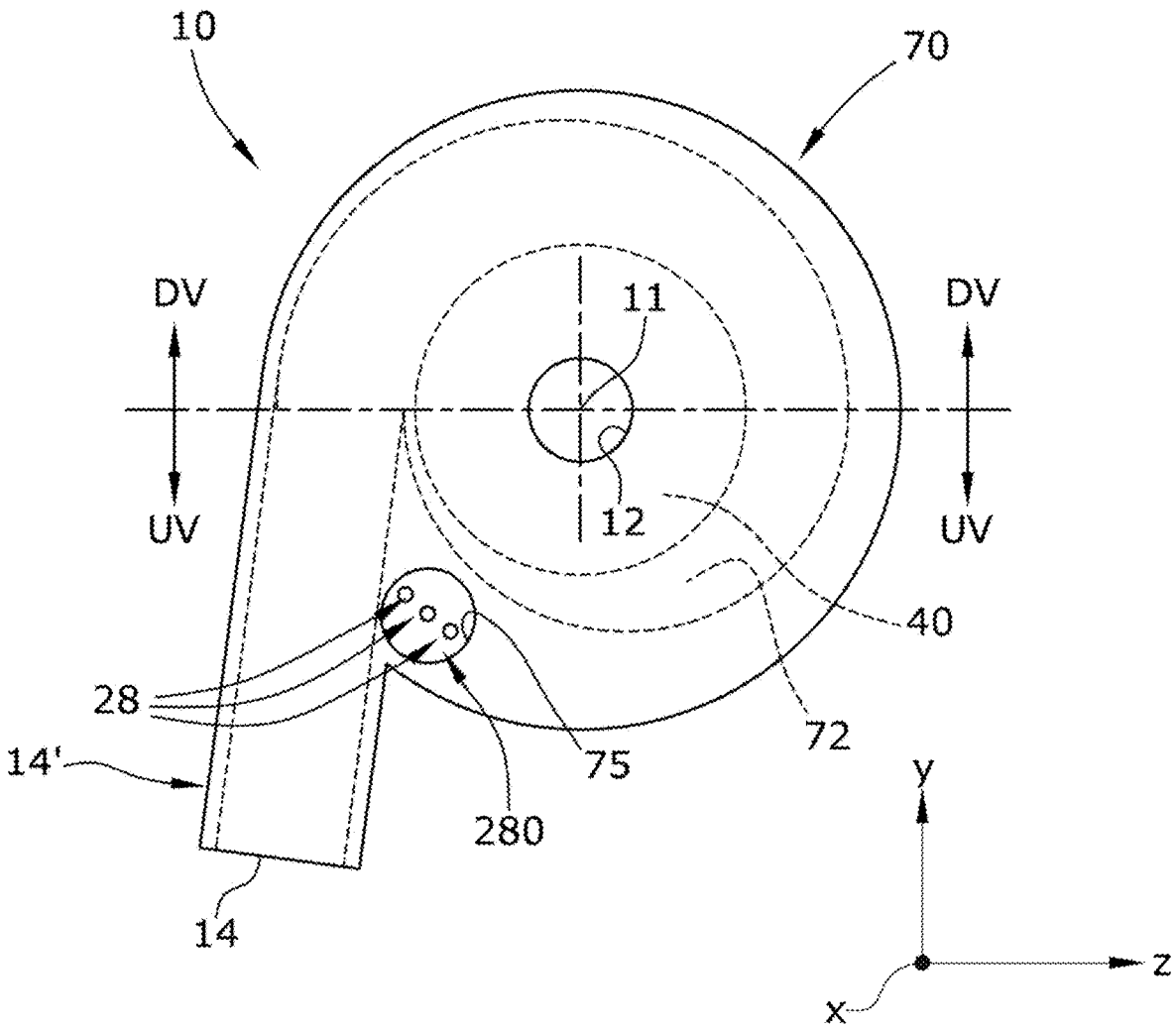
FIG. 4 shows a top view of the flow pump of FIG. 1.

As shown in FIG. 4, the axial connecting wires path 280 for the three coil connector legs 281 of the coil-connecting wires 28 is provided adjacent to the pump outlet duct 14' so that the connecting wires path 280 is located in an upstream volute-half sector UV where the cross section of the pumping volute channel 72 is smaller than in the downstream volute-half-sector DV. The total diameter of the electric flow pump 10 is not substantially affected by the connecting wires path 280.

The electric flow pump 10 is provided with an electrical pump connector plug 84 with electrical contacts defined by three pump connector pins ends 33" of three axial pump connector pins 33. The proximal pin ends 33' of the pump connector pins 33 are directly electrically connected to the printed circuit board 32 via soldering, and proximally project from the proximal side of the printed circuit board 32 into a protuberance cavity of a proximal protuberance 66 which is defined by the separation wall body 60'. The electrical pump connector plug 84 is the electrical interface of the electric flow pump 10, so that the electric flow pump 10 can be electrically connected to a suitable control device by a suitable complementary electric plug means plugged into the electrical pump connector plug 84.

The present invention is not limited to embodiments described herein; reference should be had to the appended claims.

LIST OF REFERENCE CHARACTERS

10 Electric flow pump
11 Rotational axis
12 Pump inlet
14 Pump outlet
14' Pump outlet duct
20 Electronic axial-flux motor
21 Motor stator
22 Stator body
24 Stator coils
26 Motor rotor
28 Coil-connecting wire
28' Axial pin end
28" Coil-connecting wire end
30 Motor electronics
32 Printed circuit board
33 Pump connector pins
33' Proximal pin ends
33" Pump connector pins ends 39 Dry electronics chamber
40 Pump wheel
41 Fluid inlet
42 Fluid outlet
44 Pump wheel front wall
46 Pump wheel back wall
48 Pump wheel blades
50 Bearing ring
52 Bearing part
53 Inside surface
54 Bearing sleeve
60 Separation wall
60' Separation wall body
61 Proximal wet surface
62 Distal dry surface
64 Proximal protuberance
66 Proximal protuberance
66' Protuberance cavity
67 Bearing shaft body
67' Bearing support element
68 Outside surface
70 Main housing part
71 Main housing part body
72 Pumping volute channel
73 Pump inlet duct
74 Assembly chamber
75 Assembly chamber access opening
76 Access opening lid
77 Wet pumping chamber
80 Electronics chamber lid body
82 Transversal end wall
84 Electrical pump connector plug
88 Bridge portion
89 Axial leg portion
90 Coil wires
90" Wire end
92 Welding seam
280 Connecting wires path
281 Coil connector leg
282 Legs-connecting bridge
283 Electronics connector leg
DV Downstream volute-half-sector
UV Upstream volute-half sector
x Axial direction
yz Transversal plane
What is claimed is:

1. An automotive electronic flow pump comprising:
a pump wheel which is configured to rotate, the pump wheel comprising an axial fluid inlet at a wheel upstream front side and a radial fluid outlet;
a pump housing which defines a pumping chamber and an electronics chamber;
an axial-flux motor which is configured to directly drive the pump wheel and which is arranged within the pumping chamber, the axial-flux motor comprising,
a motor stator which comprises at least one stator coil, and
a motor rotor which is arranged at a front side of the pump wheel and which is configured to co-rotate with the pump wheel;
a static separation wall arranged at a backside of the pump wheel, the static separation wall being configured to fluidically separate the pumping chamber from the electronics chamber;
a motor electronics arranged in the electronics chamber, the motor electronics being directly electrically connected to the at least one stator coil;

an electronics chamber lid body which is made of a plastic and which is configured to enclose the electronics chamber; and
a stiff U-shaped coil connecting wire which comprises a cast-in section,
wherein, at least the cast-in section of the stiff U-shaped coil connecting wire is cast into the electronics chamber lid body.

2. The automotive electronic flow pump as recited in claim 1, further comprising:
at least two coil-connecting wires which are arranged to axially pass the pumping chamber radially outside of the pumping chamber and which directly electrically connect the motor electronics to the at least one stator coil.

3. The automotive electronic flow pump as recited in claim 2, wherein each of the at least two coil-connecting wires are combined in one single substantially axial connecting wires path.

4. The automotive electronic flow pump as recited in claim 3, wherein the one single substantially axial connecting wires path is provided circumferentially in an upstream volute-half-sector where a cross section of a volute channel, which is defined by the pump housing and which surrounds the radial fluid outlet of the pump wheel, is smaller than in a downstream volute-half-sector.

5. The automotive electronic flow pump as recited in claim 1, wherein,
the static separation wall is a metal sheet body, and
the motor electronics is arranged to be in a direct thermal contact with the static separation wall.

6. The automotive electronic flow pump as recited in claim 1, wherein the static separation wall is a static separation wall body which defines a friction bearing support element which is arranged to protrude axially.

7. The automotive electronic flow pump as recited in claim 1, wherein,
the motor electronics comprises a printed circuit board,
the static separation wall is arranged to substantially lie in a transversal plane and comprises at least one proximal protuberance,
the at least one proximal protuberance defines a protuberance cavity, and
a contact pin end is arranged to protrude from the printed circuit board of the motor electronics into the protuberance cavity.

8. The automotive electronic flow pump as recited in claim 7, wherein,
the stiff U-shaped coil connecting wire further comprises an axial electronics connector leg which comprises a pin end, and
the pin end is electrically directly connected to the printed circuit board of the motor electronics.

9. The automotive electronic flow pump as recited in claim 8, wherein the stiff U-shaped coil connecting wire further comprises an axial coil connector leg which is arranged to laterally pass the pumping chamber.

10. The automotive electronic flow pump as recited in claim 8, further comprising:
at least two pump connector pins which are cast-in the electronics chamber lid body, the at least two connector pins each comprising a proximal pin end,
wherein,
the proximal pin ends are each directly electrically connected to the printed circuit board of the motor electronics.

11. The automotive electronic flow pump as recited in claim 10, wherein the proximal pin ends of the at least two pump connector pins and the pin end of the axial electronics connector leg of the stiff U-shaped coil connecting wire are parallel to each other and are axially orientated.

12. The automotive electronic flow pump as recited in claim 1, wherein the stiff U-shaped coil connecting wire further comprises a legs-connecting bridge which defines the cast-in section.

13. The automotive electronic flow pump as recited in claim 1, further comprising:

a separate coil wire comprising a wire end which is connected to the at least one stator coil, wherein, the pump housing comprises a pump housing main body which defines an axial pump inlet, a tangential pump outlet, and an assembly chamber, the stiff U-shaped coil connecting wire further comprises a coil-connecting wire end, and the coil-connecting wire end of the stiff U-shaped coil connecting wire and the wire end of the separate coil wire are electrically directly connected to each other.

14. The automotive electronic flow pump as recited in claim 13, further comprising:

a separate access opening lid, wherein, the pump housing main body further defines an assembly chamber access opening which is arranged to be closed by the separate access opening lid.

* * * * *